United States Patent
Kumar

(10) Patent No.: US 6,950,662 B2
(45) Date of Patent: Sep. 27, 2005

(54) WIRELESS COMMUNICATION DEVICE AND METHOD FOR AUTOMATIC TIME UPDATES IN PERSONAL INFORMATION MANAGEMENT APPLICATIONS

(75) Inventor: Anil K. Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 10/112,662

(22) Filed: Mar. 28, 2002

(65) Prior Publication Data

US 2004/0203848 A1 Oct. 14, 2004

(51) Int. Cl.[7] .......................... H04Q 7/20; G08C 17/00
(52) U.S. Cl. ................ 455/456.3; 455/456.1; 455/456.2; 455/456.6; 455/404.2; 455/556.2; 455/574; 455/575.9; 370/311
(58) Field of Search .................... 455/456.3, 456.1, 455/456.2, 456.6, 404.2, 556.2, 574, 575.9; 370/311

(56) References Cited

U.S. PATENT DOCUMENTS

| | | | |
|---|---|---|---|
| 5,128,938 A | * | 7/1992 | Borras .................. 370/311 |
| 5,845,257 A | | 12/1998 | Fu et al. |
| 6,198,696 B1 | * | 3/2001 | Korpi et al. ............ 368/21 |
| 6,205,326 B1 | | 3/2001 | Tell et al. |
| 6,208,996 B1 | * | 3/2001 | Ben-Shachar et al. ... 707/104.1 |
| 6,259,405 B1 | | 7/2001 | Stewart et al. |
| 6,278,660 B1 | * | 8/2001 | Tognazzini ............ 368/21 |
| 6,292,743 B1 | * | 9/2001 | Pu et al. ............. 701/202 |
| 6,317,421 B1 | | 11/2001 | Wilhelmsson et al. |
| 6,334,046 B1 | * | 12/2001 | Philipson et al. ....... 455/66.1 |
| 6,647,370 B1 | * | 11/2003 | Fu et al. ............. 705/8 |
| 2002/0038234 A1 | * | 3/2002 | Fu et al. ............. 705/8 |
| 2002/0123354 A1 | * | 9/2002 | Nowak ................ 455/456 |
| 2002/0164995 A1 | * | 11/2002 | Brown et al. .......... 455/456 |
| 2003/0131059 A1 | * | 7/2003 | Brown et al. .......... 709/206 |
| 2004/0110515 A1 | * | 6/2004 | Blumberg et al. ...... 455/456.1 |

* cited by examiner

Primary Examiner—Sonny Trinh
Assistant Examiner—Huy Phan
(74) Attorney, Agent, or Firm—Schwegman, Lundberg, Woessner & Kluth, P.A.

(57) ABSTRACT

A wireless communication device includes an applications processor to operate one or more personal information management (PIM) applications. Upon initial registration or when transiting to a new location, a baseband processor of the device automatically derives the local time using a time-zone database and current location information received from the communication network. The PIM applications operating within the device are updated with the local time. The device may receive location-based services such as advertisements that depend on the current location.

10 Claims, 3 Drawing Sheets

WIRELESS COMMUNICATION DEVICE AND METHOD FOR AUTOMATIC TIME UPDATES IN PERSONAL INFORMATION MANAGEMENT APPLICATIONS

FIELD OF THE INVENTION

The present invention pertains to electronic communications, and in particular, to wireless communication devices operating personal information management applications.

BACKGROUND OF THE INVENTION

Portable and mobile wireless communication devices may operate one or more applications that manage personal information. For example, personal digital assistants (PDAs) or laptop computers with wireless communication capability may have a scheduling application to help a user plan, manage, organize and track business as well as personal activities. These personal information management (PIM) functions allow a user to schedule meetings with remote users and manage appointments, for example. Many of these personal information management applications use the time of day/date and allow a user to set the current time and date through a user interface. These devices are concurrently used by persons residing in different time zones to schedule appointments and meetings with each other. These devices are also used by persons traveling to locations in different time zones. However, one difficulty is that as a user enters a different time zone, the user must currently either enter new time-zone information or adjust the time of day and/or date of the communication device in accordance with the local time/date. This process has several drawbacks and is prone to errors. For example, if a user enters a scheduled teleconference that takes place in a different time zone, the user must calculate the time difference and the appropriate time for entry into the electronic calendar application. This process must be repeated for all personal information management applications that use time/date information as well as for other applications that use the time/date information. As a consequence, many users do not enter updated time/date or time-zone changes when traveling and attempt to keep track of the time zone difference themselves. This can be very difficult when a user from the West coast, for example, while traveling to the East coast is scheduling a teleconference or meeting using a scheduling application with a user in Europe.

BRIEF DESCRIPTION OF THE DRAWINGS

The appended claims point out different embodiments of the invention with particularity. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Figure 1:
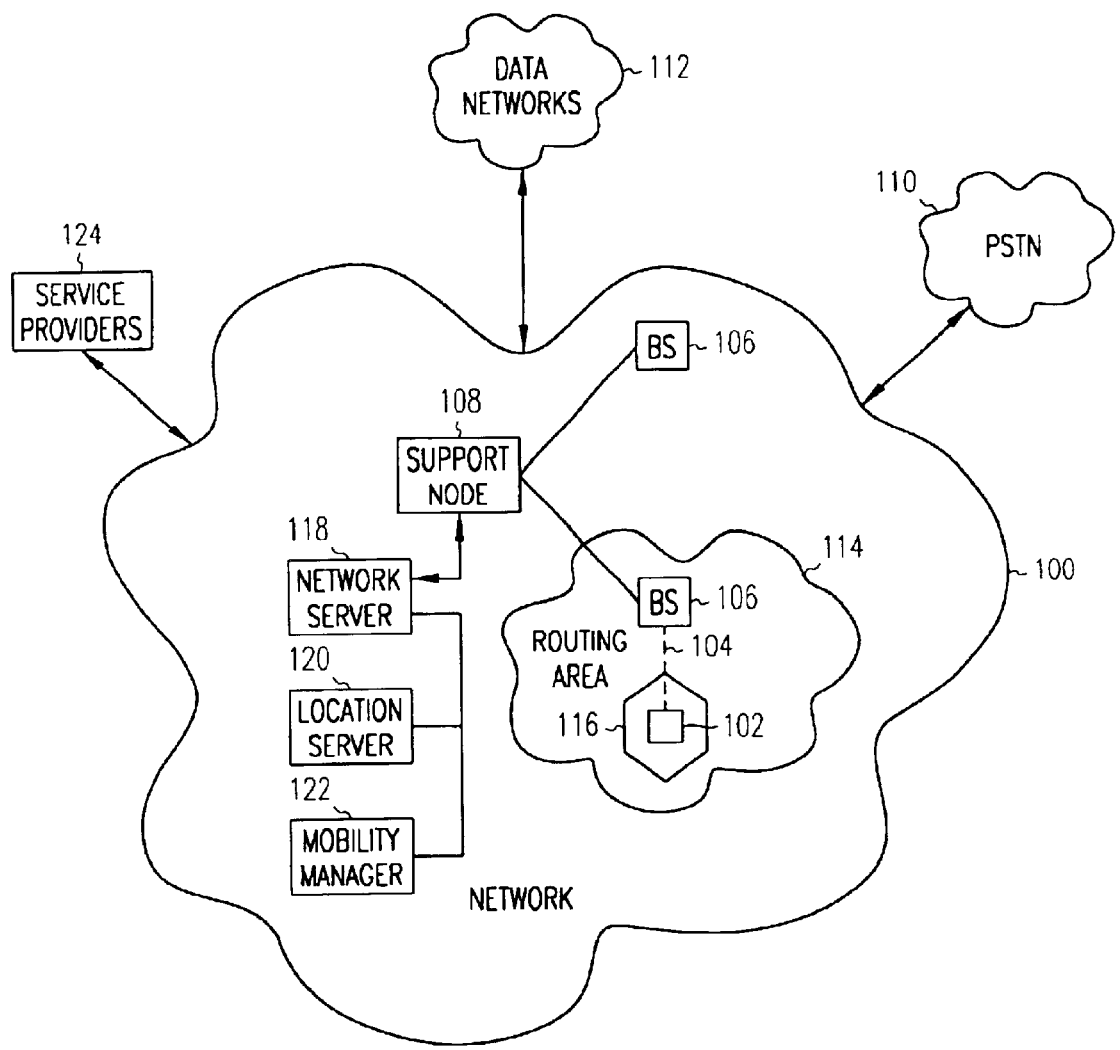
FIG. 1 illustrates the operational environment of a wireless communication device in accordance with an embodiment of the present invention.

FIG. 1 illustrates the operational environment of a wireless communication device in accordance with an embodiment of the present invention. Wireless communication device 102 may communicate over wireless links 104 within wireless communication network 100. Device 102 may be any form of wireless or mobile device or system including a mobile data terminal, a wireless or cellular telecommunication device, including 2.5G and 3G phones, or a portable computer with wireless communication functionality. Device 102 may also include functionality to operate as a personal digital assistant (PDA) or a Web tablet. Device 102 may access data networks 112 such as an intranet, the Internet or another data network through network 100, for example. Device 102 may be suitable to provide data services and, for example, receive streaming video and/or audio. Device 102 may operate one or more personal information management (PIM) applications residing on device 102. The PIM applications may include, for example, a calendar application, a scheduling application, an email application, an alarm application and/or a task application. These PIM applications may operate with a time/date function, which may be automatically updated (i.e., without user intervention) by device 102 across time zones, for example.

Device 102 may communicate through network 100 and may access other communication systems such as public switched telephone network (PSTN) 110 through wireless communication network 100. Device 102 may include functionality for communicating various information content types over wireless links 104 and implementing at least one of many communication techniques with one or more communication network 100.

Communication techniques that device 102 may implement may include digital and/or analog wireless communication techniques such as code division multiple access (CDMA) techniques, wideband CDMA techniques, frequency division multiple access (FDMA) techniques, and/or time-division multiple access (TDMA) techniques. Device 102 may also be able to communicate in accordance with various communication standards and protocols as required by network 100. Network 100 may be almost any type of network including a public land mobile network (PLMN). Network 100 may support standards such as the Pan-European mobile system standard referred to as the Global System for Mobile Communications (GSM), and may operate in accordance with packet radio services such as the General Packet Radio Service (GPRS) packet data communication service. In one embodiment of the present invention, network 100 may provide for communications in accordance with the Universal Mobile Telephone System (UMTS) for the next generation of GSM, which may implement the International Mobile Telecommunications for the year 2000 (IMT-2000) family of third-generation (3G) wireless standards, for example. In this embodiment, network 100 may provide packet data services (PDS) utilizing packet data protocols (PDP).

Network 100 may include base stations 106 for supporting communication links 104 as well as other supporting elements for facilitating communications with many wireless communication devices. In a GSM-type embodiment, network 100 may include one or more support nodes 108 that provide an interface between a packet radio type of system and other communication systems and networks. Support node 108 may provide device 102 with a communication service such as a packet data service through one of the several base stations. Support node 108 may be Servicing GPRS Support Node (SGSN).

Network 100 may include many routing areas 114, only one of which is shown, and each routing area may include many cells 116, only one of which is shown. Cells 116 provide non-interfering communication channels with adjacent cells. In an embodiment of the present invention where network 100 uses spread spectrum technology, cells may be defined by orthogonal spreading codes. Cells 116 and routing areas 114 are associated with specific geographic regions and in general do not move with respect to their geographic location. In one embodiment of the present invention, network 100 may cover geographic regions as large as several states or as large as a continent or greater. In other words, network 100 may include Europe as well as North America, for example. Network 100 may provide continuous wireless communications coverage, although the embodiments of the present invention are equally applicable when network 100 provides non-continuous coverage. In one embodiment of the present invention, support node 108 may be associated with one or more particular routing areas and may provide a routing area identity (RAI) and/or a cell identifier to device 102 when the device registers with the network, transfers to a different cell or routing area. The RAI may identify a particular routing area and may include other information usable by device 102 to derive time zone information. In one embodiment, cell-based coordinates or geographic information as well as network identification information may also be used by device 102 to derive time zone information. In one embodiment, network 100 may be a circuit-based network. In this embodiment, the current location information may comprise a location area code (LAC), for example.

Network 100 may also provide wireless communication coverage in portions of at least two or more time zones of Earth. Device 102 may communicate with network 100 at geographic locations within these different time zones. In accordance with an embodiment of the present invention, device 102 derives a local time from location information. The local time is used by the PIM applications operating on device 102. Device 102 may also automatically update its local time when device 102 locates to a new time zone, using a cell identity or an RAI, for example. Device 102 may also derive a local time when roaming within networks outside the home network. Accordingly, the PIM applications operate on device 102 with the local time without user intervention. A user no longer needs to convert the times of appointments and meeting times when roaming or traveling to a new time zone, for example. This allows a user of device 102 to set up interactive conferences with another user, for example, using a PIM application operating with updated local time information. One embodiment may create multimedia messages with local time information. For example, a user may capture a scene with a digital camera or video recorder, transfer the data to device 102 and add written or spoken comments to create a multimedia message. The multimedia message may be transferred along with the local time information anywhere in the world. In one embodiment, device 102 may include the functionality of a digital camera or video recorder, or alternatively, may have functional elements to receive data from a digital camera or video recorder over a wireless or wireline link.

In accordance with one embodiment, network 100 may include location server 120 operable through network server 118. Location server 120 may be responsive to location service requests by device 102 by providing location information to the device. Network 100 may also include mobility manager (MM) 122 which may keep track of the location of device and whether a device is in an idle, active or standby state. For a particular device, MM 122 may compare a prior RAI, for example with a current RAI to determine when the device has changed locations.

In one embodiment of the present invention, device 102 may receive location-based services from service providers 124. In this embodiment, location server 120 may provide a device's current location information to service providers 124. Service providers 124 may provide location based advertising particular to the device's location. For example, if a device is currently located near a shopping center, service providers may issue the user of a device a coupon for a store or restaurant at the shopping center, or provide advertising for a particular merchant at the shopping center. Location based services may also include emergency services such as emergency 911 service in which location server 120 may provide current location information for ambulance, police or fire services. Although support node 108, network server 118, location server 120 and mobility manger 122 are illustrated as separate functional elements, they may be implemented as one or more physical elements.

Figure 2:
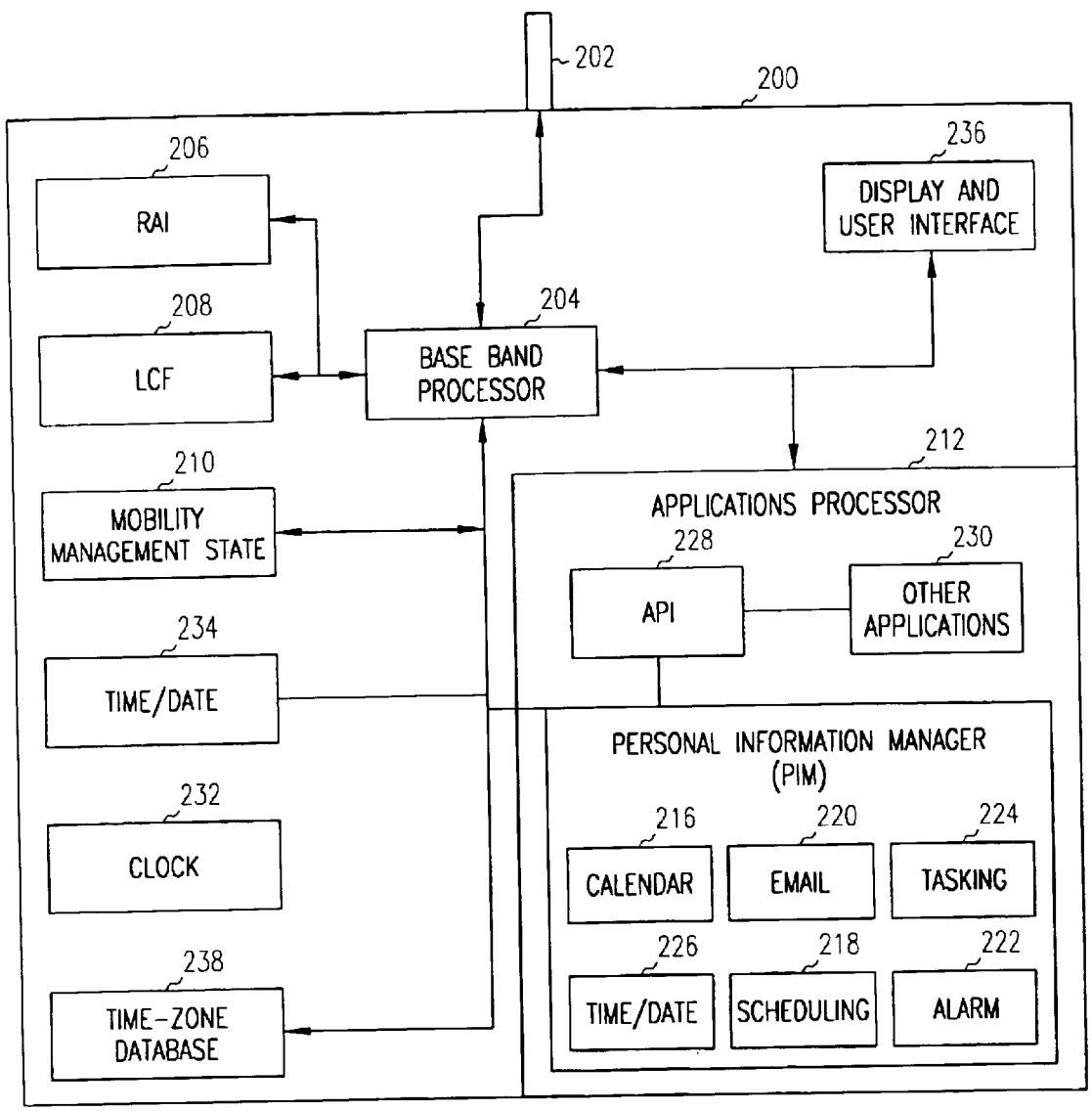
FIG. 2 is a functional block diagram of a wireless communication device in accordance with an embodiment of the present invention.

FIG. 2 is a functional block diagram of a wireless communication device in accordance with an embodiment of the present invention. Device 200 may be suitable for use as device 102 (FIG. 1) although other devices are also suitable. Device 200 includes antenna 202 for receiving and transmitting communication signals with base stations 106 of network 100 (FIG. 1). Device 200 may also include baseband processor 204 to convert the communication signals to baseband signals. Baseband processor 204 may also perform other functions including extracting location information, such as cell identities and/or RAIs from communications with the network and may store the location information in storage element 206.

In one embodiment, baseband processor 204 may implement location control function 208 to request location information from a network. The location control function may be implemented upon registration or when transitioning to a new routing area or cell, for example. In this embodiment, the network may provide location information in the form of an RAI, a cell identity or geographic coordinates to device 200.

In one embodiment, baseband processor 204 may adjust time and/or date of device 200 on initial attachment or initial registration with network 100 (FIG. 1). Baseband processor 204 may also adjust time and/or date of device 200 based on mobility information of device 200. In this embodiment, device 200 may include a mobility management state 210 indicating whether the devise is in one of an idle state, an active state or a standby state. In the idle state, device 200 is not communicating with a network. In the standby state, device 200 may be registered with a network but is not actively communicating with the network. In the active state, device 200 may be actively communicating with a network. When device 200 is in the active state, device 200 may perform periodic cell identity updates with network 100 (FIG. 1) to receive location information in the form of a cell identity, for example. In one embodiment, device 200 may determine a current routing area from the cell identity. When device 200 is in the standby state, device 200 may perform routing area updates with network 100 (FIG. 1) to receive location information in the form routing area information such as an RAI. Device 200 may use the received location information to determine if it is located in a different time zone and update its time/date information accordingly.

Device 200 also includes applications processor 212 which may operate several applications including one or more PIM applications 214. PIM applications may include, for example, calendar application 216, scheduling application 218, email application 220, alarm application 222, tasking application 224 and a time/date application 226. PIM applications 214 may interface with baseband processor 204 though applications programming interface (API) 228. Applications processor 212 may also operate other applications 230 to provide other functionality for device 200. Other applications 230 may include, among other things, applications for receiving and/or playing streaming video and/or streaming audio, applications for communicating two-way voice conversations and applications for communicating one or two-way video. Other applications 230 may also include applications for interactive conferencing and applications for multi-media messaging (e.g., sending an instant postcard or pictures), for example.

Device 200 may also include real-time clock 232 to keep time and element 234 to store and maintain relative time and date information. In one embodiment, element 234 may store the time and date of a home time zone, a local time zone and a remote time zone for use by the PIM applications. Accordingly, a user in a remote time zone (e.g., Israel) may easily schedule a meeting with scheduling application 218 with a user of a wireless device operating in some local time zone (e.g., East coast of U.S.) that is not in its home time zone (e.g., West coast of U.S.). Display and user interface elements 236 for example, may display the updated local time and date, and may also display the time of the home time zone, for example.

In accordance with embodiments of the present invention, device 200 includes storage element 238 for storing a time-zone database, which may correlate time zones with location information. For example, each routing area 114 of network 100 may be located within a particular time zone. In addition, each cell 116 may be located within a particular time zone. The time-zone database may store this information, for example, in the form of a look-up-table (LUT) correlating cell identity and/or routing area information with time-zone information. Some routing areas may be located on the border of two time zones and may be associated with both these time zones. In this situation, device 200 may utilize cell identity information to distinguish between time zones. In one embodiment, the time-zone database may include information to indicate whether or not a particular location observes daylight savings time. The time-zone database may be provided by and/or updated by network 100 (FIG. 1) and downloaded to device 200. The time-zone database may also be loaded into device 200 by other means including, for example, an infrared link (not shown) from an external database from a home computer, for example.

In accordance with an embodiment of the present invention, baseband processor 204 derives a local time from current location information using time-zone database 238, and updates PIM applications 214 operating on device 200 with the local time. Baseband processor 204 may also update the date to the local date as required, for example, when a transition past midnight or travel across a date line occurs.

In one embodiment, baseband processor 204 refrains from updating the PIM applications when mobility management state 210 is "idle". On the other hand, when mobility management state 210 is "standby", device 200 may be registered with a network and baseband processor 204 may receive an RAI from the network as current location information. In this case, baseband processor 204 may derive the local time from the RAI. When mobility management state 210 is "active", device 200 may be communicating with the network from within a particular cell. In this case, baseband processor 204 may receive a cell identity of the cell from the network in which device 102 is communicating. The cell identity in this case may be the current location information. The baseband processor may derive the local time from the cell identity, or may determine the RAI from the cell identity. Device 200 may derive the local time when the RAI is different from a prior RAI.

Device 200 is illustrated in FIG. 2 as having several functionally separate elements, however one or more of these functional elements may be combined. In addition, many of the functional elements may be implemented with a combination of hardware and software functional elements such as one or more processors configured with software, including digital signal processors (DSPs) or microcontroller units.

Figure 3:
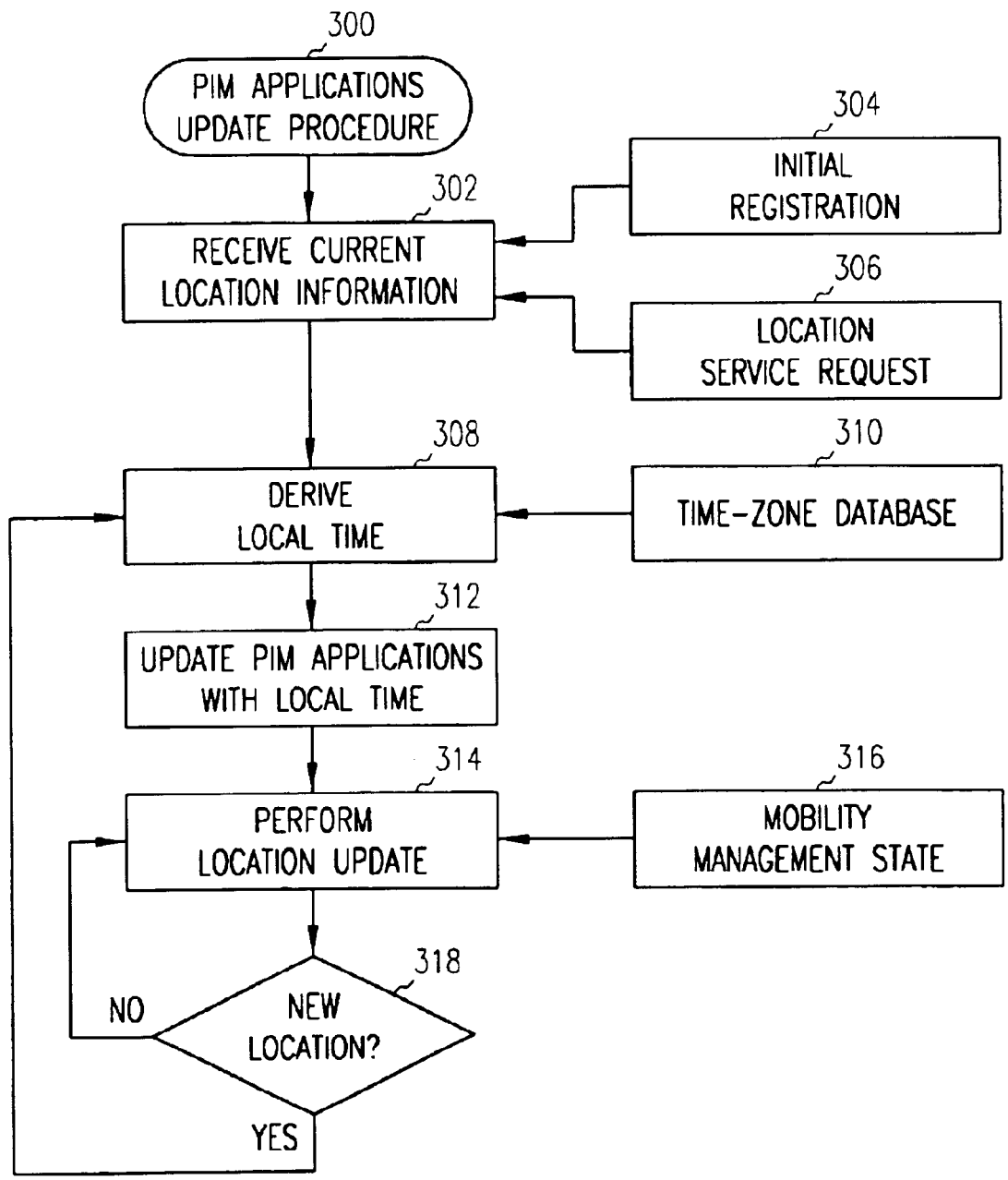
FIG. 3 is a flow chart of a procedure for updating personal information management applications in accordance with an embodiment of the present invention.

FIG. 3 is a flow chart of a procedure for updating personal information management (PIM) applications in accordance with an embodiment of the present invention. Procedure 300 automatically updates PIM applications operating on a wireless communication device with a local time/date using current location information. In at least one embodiment, no additional bandwidth is consumed because the current location information is available to the communication device and the local time/date may be derived with information present within the communication device. Procedure 300 may be performed by a wireless communication device such as device 200 (FIG. 2), although other devices are also suitable. Although the individual operations of procedure 300 are illustrated and described as separate operations, one or more of the individual operations may be performed concurrently and nothing requires that the operations be performed in the order illustrated.

Operation 302 receives current location information. A wireless communication device may receive the current location information during initial registration operation 304, for example, or as part of location service request operation 306. The current location information may identify a routing area and may comprise a routing area identity (RAI). The current location information may also or alternatively identify a particular cell and may comprise a cell identity. The current location information may also include coordinates such as geo-location coordinates. In one embodiment of the present invention, as part operation 314, a wireless device may request a particular quality of service (QOS) level, which may be supported by the network. When the communication network is a circuit-based network, the location information may comprise a location area code (LAC).

Operation 308 derives the local time from the current location information, and may use time-zone database 310 to correlate time zone information with the location information. Operation 308 may, for example, involve subtracting or adding a number of hours to a current or home time stored in the wireless device when it is determined that the device is operating in a new time zone. Operation 308 may also involve updating a local date when the new time zone is across the International Date Line or when midnight occurs. In one embodiment of the present invention, a wireless device may also receive local time zone information when registering with the network as part of operation 304. In this embodiment, operation 308 is not necessarily required to be performed.

Operation 312 updates the PIM applications operating on the wireless device with the derived local time and/or date. Operation 314 performs a location update, which may depend on mobility manager state 316 of the device. For example, no location update may be performed in the idle state. During operation 314, the device receives location information, which may be in the form of an RAI or cell identity. Operation 314 may be performed, for example, on a regular basis, or when a device roams to a new location, which may be in a different time zone.

Operation 318 compares the location information received in operation 314 with stored location information to determine if the device has changed locations. If the device has changed locations, operations 308 through 318 may be repeated and the PIM applications may be updated with a new local time if the new location is within a different time zone in accordance with operations 308 and 312.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method for operating personal information manager (PIM) applications on a wireless communication device comprising:

deriving a local time from current location information received from a network; and updating at least one of the PIM applications operating on the device with the local time, wherein the device has a mobility management state associated therewith, the mobility management state being one of either an idle state, an active state or a standby state, wherein when the mobility manager is in the idle state, the device refrains from updating the at least one of the PIM applications, wherein when the device in the standby state, the device is registered with the network, the device performs a routing area update procedure to receive routing area identity information from the network as the current location information, and derives the local time from the routing area identity information.

2. The method of claim 1 wherein the routing area identity information is received through a base station of a packet radio network supporting packetized wireless communications, the routing area identity information being stored at a support node of the network coupled with the base station.

3. A method for operating personal information manager (PIM) applications on a wireless communication device comprising:

determining packet routing information from a packet-based wireless network;

deriving a local time from the racket routing information; and updating at least one of the PIM applications operating on the device with the derived time, wherein the device has a mobility management state associated therewith, the mobility management state being one of either an idle state, an active state or a standby state, the method comprising refraining from updating the at least one of the PIM applications when the mobility manager is in the idle state, and wherein:

when the device is in the active state, the device communicates with the network from within a cell, and the method further comprises performing a cell-update procedure to receive a cell identity of the cell from the network, wherein the cell identity comprises the packet routing information, and wherein the local time is derived using the cell identity.

4. The method of claim 3, further comprising:

determining routing area identity information from the cell identity;

comparing the routing area identity information with prior routing area identity information stored in the device; and modifying the local time when the determined routing area identity information differs from the prior routing area identity information.

5. A method for operating personal information manager (PIM) applications on a wireless communication device comprising:

deriving a local time from current location information received from a network;

updating at least one of the PIM applications operating on the device with the local time;

receiving the current location information from the network;

when the current location information differs from prior location information stored within the device, determining whether the current location information is associated with a different time zone than the prior location information;

when the current location information is not associated with the different time zone, the method comprises refraining from deriving the local time and updating the PIM applications; and when the current location information is associated with the different time zone, deriving the local time and updating the PIM applications.

6. The method of claim 5 wherein the network is a circuit-based network and the current location information comprises a location area code (LAC).

7. A wireless communication device comprising:

an applications processor to operate a plurality of personal information manager (PIM) applications;

a baseband processor to derive a local time from packet routine information received from a packet-based wireless network and to update at least one of the PIM applications with the local time; and a storage element to store a mobility management state associated therewith, the mobility management state being one of either an idle state, an active state or a standby state, and wherein the baseband processor refrains from updating the PIM applications when the device is in the idle state, wherein when the device is in the standby state, the device is registered with the network and the baseband processor receives routing area identity information from the network, the routing area identity information comprising the packet routing information, the baseband processor derives the local time from the routing area identity information.

8. The device of claim 7 wherein, when the device is in the active state, the device communicates with the network from within a cell and the baseband processor receives a cell identity of the cell from the network, the cell identity comprising the packet routing information, and wherein the baseband processor derives the local time from the cell identity.

9. A method of operating a wireless communication system comprising:

providing racket routing information to a wireless communication device, wherein the wireless communication device derives a local time from the packet routing information and stored time-zone information to update personal information management applications thereon with the local time;

providing a location-based service to the wireless communication device particular to a current location of the wireless communication device based on the packet routing information, wherein a location server tracks the packet routing information for the wireless communication device and provides the packet routing information to a service provider, and wherein the location based service includes either an advertisement or a coupon sent from the service provider in response to the packet routing information for the wireless communication device, and wherein the method further comprises:

tracking a state of the wireless communication device with a mobility manager, the wireless communication device being in either an idle, standby, or active state;

sending the wireless communication device routing area identification information as the packet routing information when the device is in the standby state; and sending the wireless communication device cell identity information as the packet routing information when the device is in the active state.

10. The method of claim 9 further comprising:

location service request from the wireless communication device, the location service request including a requested quality of service level for subsequent packet-based communications; and providing the packet routing information to the wireless communication device in response to the location service request.

* * * * *